(12) United States Patent
Beierl et al.

(10) Patent No.: US 7,641,258 B2
(45) Date of Patent: Jan. 5, 2010

(54) CONVERTIBLE TOP AND CONVERTIBLE

(75) Inventors: Dominik Beierl, Korntal-Münchingen (DE); Felix Hermann, Leonberg (DE); Lars Schulz, Schöneiche (DE); Wolfgang Braun, Albershausen (DE)

(73) Assignee: Dr. Ing. h.c. F. Porsche Aktiengesellschaft, Weissach (DE)

( * ) Notice: Subject to any disclaimer, the term of this patent is extended or adjusted under 35 U.S.C. 154(b) by 282 days.

(21) Appl. No.: 11/852,426

(22) Filed: Sep. 10, 2007

(65) Prior Publication Data

US 2008/0061585 A1    Mar. 13, 2008

(30) Foreign Application Priority Data

Sep. 8, 2006    (DE) ............. 10 2006 042 260

(51) Int. Cl.
*B60J 7/08* (2006.01)

(52) U.S. Cl. .................................. 296/107.09

(58) Field of Classification Search ............ 296/107.01, 296/108, 121, 107.07, 107.09, 107.16
See application file for complete search history.

(56) References Cited

U.S. PATENT DOCUMENTS

| | | | | | |
|---|---|---|---|---|---|
| 3,097,883 | A | * | 7/1963 | Gilson et al. ................. | 296/108 |
| 5,026,110 | A | * | 6/1991 | Koop et al. .................. | 296/108 |
| 5,338,085 | A | * | 8/1994 | Guckel et al. ................ | 296/121 |
| 5,429,409 | A | * | 7/1995 | Corder et al. ................. | 296/108 |
| 5,593,202 | A | * | 1/1997 | Corder et al. ................. | 296/108 |
| 5,788,316 | A | * | 8/1998 | Rothe .................... | 296/107.07 |
| 6,454,342 | B2 | | 9/2002 | Hesselhaus et al. | |
| 6,460,913 | B2 | | 10/2002 | Fischer | |
| 6,485,085 | B1 | * | 11/2002 | Pecho et al. ........... | 296/107.07 |
| 6,578,898 | B2 | | 6/2003 | Rothe et al. | |
| 6,902,223 | B2 | | 6/2005 | Hollenbeck et al. | |
| 2006/0170240 | A1 | * | 8/2006 | Wagner .................. | 296/107.01 |
| 2008/0061582 | A1 | * | 3/2008 | Beierl et al. ........... | 296/107.04 |
| 2008/0061584 | A1 | * | 3/2008 | Hermann et al. ....... | 296/107.07 |
| 2008/0061587 | A1 | * | 3/2008 | Beierl et al. ........... | 296/107.09 |

FOREIGN PATENT DOCUMENTS

| | | |
|---|---|---|
| DE | 195 15 541 C1 | 6/1996 |
| DE | 100 29 471 B4 | 1/2002 |
| DE | 100 29 473 A1 | 1/2002 |
| DE | 100 29 478 B4 | 1/2002 |
| DE | 202 10 763 U1 | 11/2003 |
| EP | 1 112 878 A2 | 7/2001 |
| FR | 548 437 | 1/1923 |

* cited by examiner

*Primary Examiner*—H Gutman

(57) ABSTRACT

A top for a convertible has a linkage with which a plurality of roof sections can be displaced between a closed position and an open position. The rearmost roof section is configured as a rear window frame, and the linkage has a control link which is mounted pivotally on a bracket which can be fastened or is fastened to the vehicle. The linkage has a clamping hoop and a coupling linkage for controlling the kinematics of the rear window frame, said coupling linkage having a front coupling link and a rear coupling link which are mounted pivotally on the clamping hoop and on the rear window frame. In order to stabilize the top in its end positions, for the rear coupling link, there is formed on the clamping hoop a front stop against which the rear coupling link bears when the top is closed, and a rear stop against which the rear coupling link bears when the top is open.

12 Claims, 2 Drawing Sheets

CONVERTIBLE TOP AND CONVERTIBLE

CROSS-REFERENCE TO RELATED APPLICATION

This application claims the priority, under 35 U.S.C. §119, of German application DE 10 2006 042 260.0, filed Sep. 8, 2006; the prior application is herewith incorporated by reference in its entirety.

BACKGROUND OF THE INVENTION

Field of the Invention

The present invention relates to a top for a convertible and also to a convertible equipped with a top of this type. The top for the convertible includes the following elements:

a linkage with which a plurality of roof sections can be displaced between a closed position, in which the roof sections are arranged one behind another in the direction of travel, and an open position, in which the roof sections are arranged one above another;

wherein the rearmost roof section in the direction of travel, when the top is closed, is configured as a rear window frame for receiving a rear window;

wherein the linkage has, on each side of the vehicle, a control link for controlling the kinematics of at least one roof section which, when the top is closed, is located in front of the rear window frame in the direction of travel and is mounted pivotally on a bracket which can be fastened or is fastened to the vehicle;

wherein the linkage has a clamping hoop which extends from one side of the vehicle to the other side of the vehicle;

wherein the linkage has a coupling linkage for controlling the kinematics of the rear window frame, the coupling linkage having, on each side of the vehicle, a front coupling link and a rear coupling link; and wherein each of these coupling links is mounted pivotally firstly on the clamping hoop and secondly on the rear window frame.

German patent DE 100 29 471 B4 (cf. U.S. Pat. No. 6,578, 898 B2) discloses a top for a convertible, which has a linkage with which a plurality of roof sections can be displaced between a closed position and an open position. In the closed position, the roof sections are arranged one behind the other in the direction of travel. In the open position, at least individual roof sections are arranged one above another. The rearmost roof section in the direction of travel when the top is closed is configured as a rear window frame for receiving a rear window. In the case of the known top, the roof sections which are arranged in front of the rear window frame in the direction of travel when the top is closed are formed by transverse bows which are connected to one another by a flexible covering attached thereon. In order to control the kinematics of the transverse bows, the linkage has, on each side of the vehicle, at least one control link which is mounted pivotally on a bracket to be fastened to the vehicle. Furthermore, the linkage has a clamping hoop which extends from one side of the vehicle to the other side of the vehicle and on which the rear window frame rests when the top is closed. Furthermore, the linkage comprises a coupling linkage for controlling the kinematics of the rear window frame, for which purpose the coupling linkage has, on each side of the vehicle, a respective front coupling link and rear coupling link. In this case, the coupling links are in each case mounted pivotally firstly on the clamping hoop and secondly on the rear window frame.

In the case of the known top, the rear window frame is activated by, firstly, the clamping hoop being mounted pivotally at its ends on the brackets and being driven with the aid of a corresponding actuator in order to carry out pivoting movements. Secondly, the rear window frame is joined to the flexible covering. Displacement of the clamping hoop results in inevitable displacement of the rear window frame via the coupling link and via the connection of the rear window frame to the covering.

German published patent application DE 100 29 473 A1 (cf. U.S. Pat. No. 6,454,342 B2) discloses a further convertible top in which a respective guide subassembly is used instead of rear coupling links in order to couple the rear window frame to the clamping hoop. In addition, the respective front coupling link is coupled to a control link via a guide strut in order to be able to drive the control link such that it pivots during a pivoting displacement of the clamping hoop.

A further convertible top of this type is known from German patent No. DE 100 29 478 B4 (cf. U.S. Pat. No. 6,578, 898 B2).

SUMMARY OF THE INVENTION

It is accordingly an object of the invention to provide a convertible top and convertible which overcomes the above-mentioned disadvantages of the heretofore-known devices and methods of this general type and which is distinguished, in particular, by a reduced tendency of the top to vibrate even at relatively high speeds of the vehicle equipped therewith.

With the foregoing and other objects in view there is provided, in accordance with the invention, a top for a convertible vehicle, comprising:

a plurality of roof sections movably disposed between a closed position, in which the roof sections are disposed one behind another in a direction of travel, and an open position, in which the roof sections are disposed one above another;

the roof sections including a rearmost roof section in a forward direction of travel, when the top is closed, configured as a rear window frame for receiving a rear window, and a second roof section disposed in front of the rear window frame when the top is closed;

a linkage for displacing the roof sections between the open and closed positions;

the linkage having a control link, on each side of the vehicle, for controlling kinematics of the second roof section and mounted pivotally on a bracket stationarily fastened or to be fastened to the vehicle;

the linkage having a clamping hoop extending from one side of the vehicle to an opposite side of the vehicle;

the linkage having a coupling linkage for controlling kinematics of the rear window frame, the coupling linkage including, on each side of the vehicle, a forward coupling link and a rear coupling link;

each the forward and rear coupling links being pivotally mounted to the clamping hoop and to the rear window frame;

a front stop and a rear stop formed on the clamping hoop on at least one side of the vehicle, the rear coupling link bearing against the front stop when the top is closed and bearing against the rear stop when the top is open.

The present invention is based on the general concept of, for the respective rear coupling link, there being formed on the clamping hoop a front and a rear stop against which the rear coupling link comes to bear in the open position and, respectively, in the closed position of the top. With the aid of these stops, a respective predetermined relative position can be defined for the rear window frame and the clamping hoop in the closed position and in the open position of the top, as a result of which positional fixing of the clamping hoop and of the rear window frame simultaneously takes place in the respective position of the top. The improved positioning and the reinforced fixing of clamping hoop and rear window frame in the end positions of the top result in increased stability of the top, and relative movements between rear window frame and clamping hoop can be reduced.

In an advantageous embodiment of the invention, the linkage can be configured in such a manner that, in the open position, the respective rear coupling link bears under prestress against the rear stop and, in the closed position, bears under prestress against the front stop. The prestressed bearing of the rear coupling levers against the respective stop enables the tendency for relative movements between rear window frame and clamping hoop to be further reduced. In particular, the risk of noise being produced can also be reduced as a result.

Accordingly, in accordance with an added feature of the invention, the linkage is configured such that the respective the rear coupling link bears under prestress against the rear stop in the open position, and/or the respective the rear coupling link bears under prestress against the front stop in the closed position.

In accordance with an additional feature of the invention, the clamping hoop has ends on both sides of the vehicle each pivotally mounted on a respective the control link.

In accordance with an another feature of the invention, the coupling linkage on each side of the vehicle has a driving link articulated to the respective the control link and to the respective the front coupling link.

In accordance with a further feature of the invention, the front stop and the rear stop are formed integrally on a stop body attached to the clamping hoop.

In accordance with again an added feature of the invention, the front stop and the rear stop are integrally formed on the clamping hoop.

In accordance with again another feature of the invention, the comprises a guide formed on the rear window frame and wherein a bearing point, at which the respective the front coupling link is pivotally mounted to the rear window frame, is displaceably mounted in the guide formed on the rear window frame.

In accordance with again an additional feature of the invention, the guide is formed in a slotted link body attached to the rear window frame.

In accordance with again a further feature of the invention, the respective the rear coupling lever is pivotally mounted on the respective the slotted link body.

In accordance with yet again an added feature of the invention, the comprises a flexible covering at least partially covering the linkage or the linkage and the roof sections.

In accordance with a concomitant feature of the invention, the roof sections are sheet-type components shaped, in the closed position of the top, to form a closed roof contour extending from the front to the rear in the direction of travel.

With the above and other objects in view there is also provided, in accordance with the invention, a convertible comprising a top as outlined above mounted to a roof of the convertible.

It goes without saying that the features mentioned above and those which have yet to be explained below can be used not only in the respectively stated combination but also in other combinations or on their own without departing from the scope of the present invention.

Other features which are considered as characteristic for the invention are set forth in the appended claims.

Although the invention is illustrated and described herein as embodied in convertible top, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
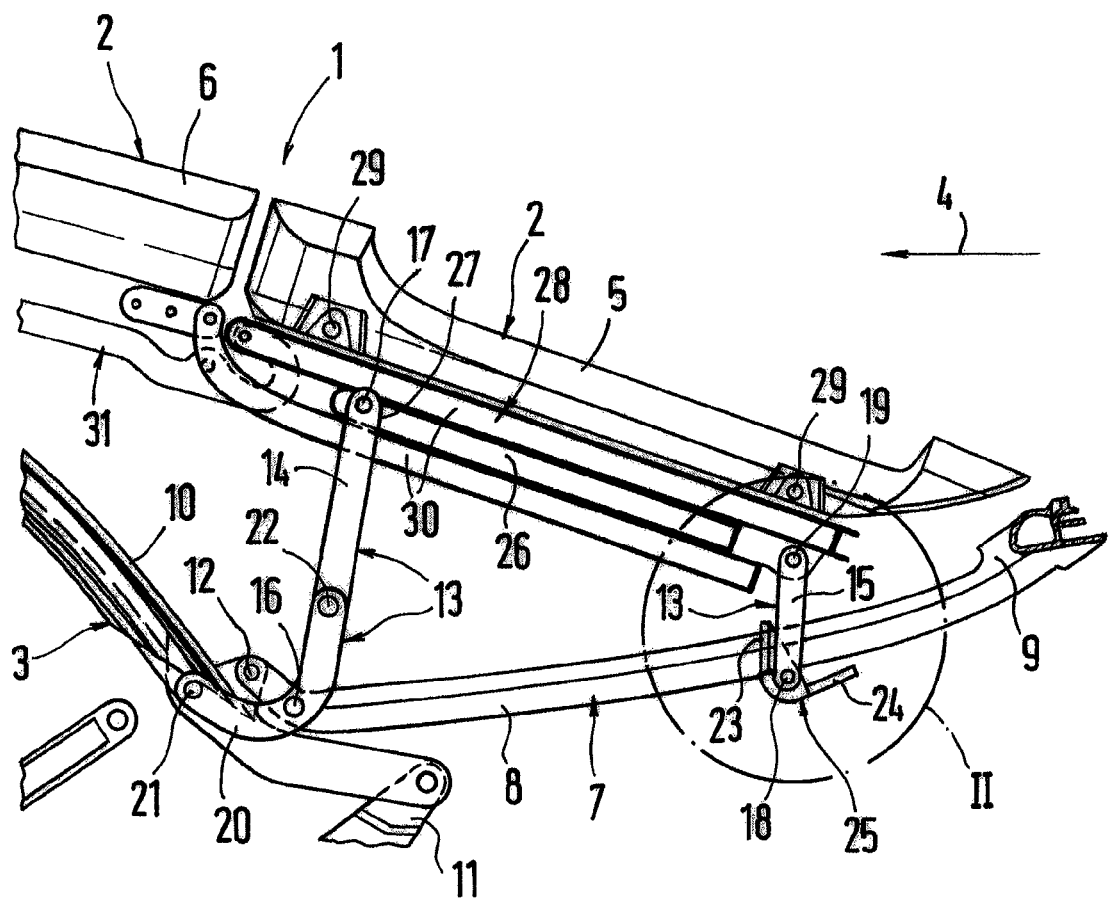
FIG. 1 shows a side view of a top in the region of a rear window frame.

Referring now to the figures of the drawing and first, particularly, to FIG. 1 thereof, a top 1 has a plurality of roof sections 2 of which, however, only two are illustrated here. In addition, the top 1 comprises a linkage 3 which serves to displace the roof sections 2 between a closed position, indicated in FIG. 1, and an open position. When fitted, the top 1 is located on a convertible (not shown here) and, in its closed position, serves to close a vehicle interior.

The individual roof sections 2 are configured as sheet-like components and, in the closed position of the top 1, adjoin one another in a direction of travel 4 indicated by an arrow. By this means, in the closed position of the top 1, the roof sections 2 which are arranged one behind another form a continuous roof contour which is closed from the front to the rear. The top 1 can have two, three, four or more roof sections 2. An embodiment with four roof sections 2 is preferred. The rearmost roof section 2 in the direction of travel 4 when the top 1 is closed is designed as a rear window frame 5 which serves to receive a rear window (not shown here). The frontmost roof section 2 in the direction of travel 4 when the top 1 is closed is preferably configured as an integral roof frame. If three or more roof sections 2 are provided, the roof sections 2 which, in the closed position of the top 1, are arranged between the integral roof frame and the rear window frame 5, are configured as surface bows. In the case of four roof sections 2, a front or first surface bow and a rear or second surface bow 6 are then provided.

The linkage 3 comprises a clamping hoop 7 which, in a view from above, is of U-shaped or C-shaped configuration. The clamping hoop 7 therefore has, on each side of the vehicle, a limb 8 and a base 9 connecting the two limbs 8 to each other. In the closed position of the top 1, the clamping hoop 7, in the region of its base 9, adjoins the rear window frame 5 to the rear and serves overall to close a gap which arises between the top 1 and a top compartment lid (not shown) in the closed position of the top 1. Said top compartment lid serves to close a top compartment (not shown here) which is formed in the convertible and in which the top 1, or at least the roof sections 2, are put away and stowed when the top 1 is open. In order to keep the space required for this top compartment as small as possible, the linkage 3 is configured in such a manner that it can activate the individual roof sections 2 in order to realize a kinematics which leads to the roof sections 2 being arranged one above another in the open position of the top 1. A compact packing size can be realized, in particular, by the roof sections 2 virtually being stacked on one another when the top 1 is open in such a manner that, in the case of each roof section 2, the inside points downward and the outside points upward. In the case of the roof sections 2, in the present context "inside" is understood in each case as meaning that side which, when the top 1 is closed, faces the vehicle interior where it forms a section of the roof lining. The respective outside of the roof sections 2 is then situated on the side facing away from the vehicle interior. If the top 1 has precisely four roof sections 2, a kinematics is preferred, in which, in the open position of the top 1, the second surface bow 6 is arranged below the rear window frame 5 and, in particular, above the clamping hoop 7. The integral roof frame and the first surface bow are then arranged above the rear window frame 5, with the first surface bow preferably being positioned between the rear window frame 5 and the integral roof frame. By means of this arrangement, a particularly compact configuration can be obtained for the open position of the top 1. A small top compartment is advantageous in particular in the case of vehicles with a rear engine.

The linkage 3 is preferably configured in such a manner that, in the closed position of the top 1, it forms a respective lateral roof frame on both sides of the vehicle. The roof sections 2 are arranged between said two roof frames.

Furthermore, in a preferred embodiment, the top 1 can be provided with a flexible covering (not shown). This covering is fitted to the top 1 in such a manner that, when the top 1 is closed, it covers at least the linkage 3 on each side of the vehicle. The top 1 therefore has a fabric roof at least in the region of the lateral roof frames. The roof sections 2 are preferably also covered by the covering, with the rear window in the rear window frame 5 being recessed in the covering. In this embodiment, the entire top 1 is then configured as fabric roof. The respective covering is expediently clamped to the clamping hoop 7. Owing to their sheet-like configuration, the roof sections 2 covered by the covering form a corresponding sheet-like and shaping support for the covering. By this means, for conventional fabric roofs, the covering of which is stretched on with the aid of a plurality of bows, a continuous roof contour which has aerodynamic advantages can be realized. The improved aerodynamics enables the forces acting on the closed top 1 while the convertible equipped therewith is being driven to be reduced. As a result, the tendency to form noise at high speeds can be averted.

The linkage 3 has, on each side of the vehicle, a control link 10 which can be used to displace at least one roof section 2 which, when the top 1 is closed, is arranged in front of the rear window frame 5. For example, in the case of a top 1 provided with four roof sections 2, the respective control link 10 is connected directly to the first surface bow. In every case, the respective control link 10 is mounted pivotally on a bracket 11. In the fitted state of the top 1, the respective bracket 11 is fastened to the convertible body. At the free ends of its limbs 8, the clamping hoop 7 is mounted pivotally in each case on one of the control links 10, to be precise at a bearing point denoted by 12. Accordingly, the clamping hoop 7 extends from one side of the vehicle to the other side of the vehicle, with the limbs 8 essentially extending in the longitudinal direction of the vehicle while the base 9 extends transversely with respect thereto and horizontally. In the closed position of the top 1, the rear window frame 5 bears in its rear region against the clamping hoop 7, at least along the base 9, via a seal (not illustrated) here.

Figure 2:
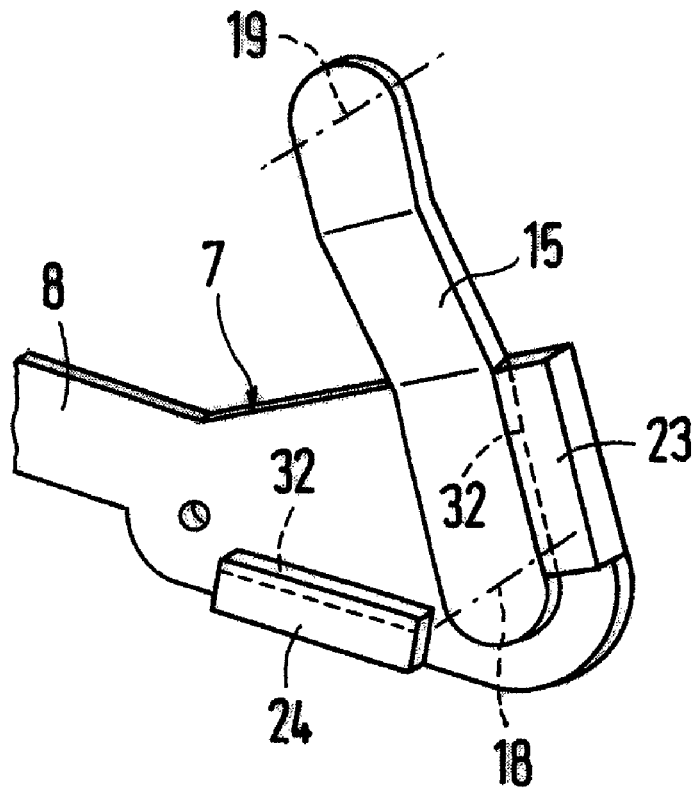
FIG. 2 shows an enlarged view of a detail 11 in FIG. 1, in a closed position of the top.
Figure 3:
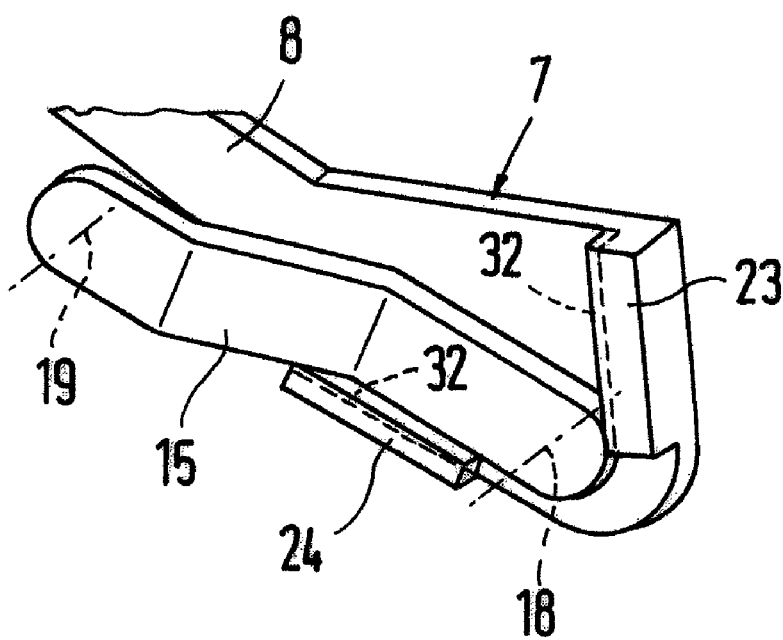
FIG. 3 is a view similar to that of FIG. 2, but illustrating an open position of the top.

The linkage 3 now comprises a coupling linkage 13, with the aid of which the kinematics of the rear window frame 5 can be controlled. For this purpose, said coupling linkage 13 has, on each side of the vehicle, a respective front coupling link 14 and a respective rear coupling link 15. Each front coupling link 14 is mounted pivotally at one end, at 16, on the clamping hoop 7 and, at the other end, at 17, on the rear window frame 5. Each rear coupling link 15 is mounted pivotally at one end, at 18, on the clamping hoop 7 and, at the other end, at 19, on the rear window frame 5. Furthermore, the coupling linkage 13 preferably comprises, on each side of the vehicle, a driving link 20 which is mounted pivotally at one end, at 21, on the respective control link 10 and, at the other end, at 22, on the respective front coupling link 14. The pivotal mountings mentioned and those which have yet to be mentioned each have—unless stated otherwise—a pivot axis which extends transversely with respect to the longitudinal direction of the vehicle and horizontally. Such pivot axes are indicated in FIGS. 2 and 3 for the bearing points 18 and 19 by chain-dotted lines.

According to the invention, for the respective rear coupling link 15, there is now formed on the clamping hoop 7, at least on one side of the vehicle, but preferably on both sides of the vehicle, a front stop 23 and a rear stop 24. The stops 23, 24 are matched to the kinematics of the clamping hoop 7 and of the rear window frame 5 in such a manner that, when the top 1 is closed, the respective rear coupling link 15 bears against the front stop 23 and, when the top 1 is open, bears against the rear stop 24. With the aid of the stops 23, 24, a respective relative position between rear window frame 5 and clamping hoop 7 can therefore be defined or predetermined for the two end positions of the top 1. At the same time, a positional fixing both for the clamping hoop 7 and for the rear window frame 5 can be realized by the stops 23, 24, against which the respective rear coupling link 15 bears in the abovementioned end positions, which improves the stability of the top 1 in the end positions. Furthermore, the stops 23, 24 lead to increased functional reliability of the top 1.

According to a preferred embodiment of the invention, the linkage 3 which comprises the coupling linkage 13 is matched to the clamping hoop 7 and the rear window frame 5 in such a manner that, at least in one of the two end positions of the top 1, but preferably in both end positions of the top 1, the respective rear coupling link 15 obtains a prestressed bearing against the front stop 23 or against the rear stop 24. Further stabilization of the relative position between rear window frame 5 and clamping hoop 7 is achieved by the bearing under prestress between rear coupling link 15 and the respective stop 23, 24. Furthermore, for the driving mode of the convertible, a tendency to relative movements between rear window frame 5 and clamping hoop 7 and therefore the risk of noise forming is thereby significantly reduced. By means of the prestressed bearing of the rear coupling links 15 against the stops 23, 24, bracing is realized for the rear region of the top 1 in the end positions thereof, which has a positive effect on the stability of the entire top 1.

In the embodiment shown in FIG. 1, the two stops 23, 24 are formed integrally on a stop body 25 which is produced separately from the clamping hoop 7 and which is attached to the clamping hoop 7. In principle, the stops 23, 24 can also be formed integrally on the clamping hoop 7. It is likewise possible to form one of the stops 23, 24 integrally on the clamping hoop 7 and the other stop 23, 24 in each case integrally on the stop body 25.

According to FIG. 1, the bearing point 17, in which the respective front coupling link 14 is mounted pivotally on the rear window frame 5, can be mounted displaceably in a guide 26 which is formed on the rear window frame 5. Said guide 26 is preferably configured as a linear guide which extends essentially parallel to a plane (not shown) on the rear window frame 5, as a result of which the abovementioned bearing point 17 can be displaced along the rear window frame 5. For this purpose, the respective front coupling link 14 can be displaceable in a sliding manner in the guide 26 via a sliding block 27, with the front coupling link 14 being mounted pivotally on said sliding block 27 in order to form said bearing point 17. Instead of a sliding block 27, use can also be made of a roller or of any other rolling body.

In the example shown, the guide 26 is not formed directly on the rear window frame 5 but rather in a slotted link body 28 which is produced separately with respect to the rear window frame 5 and which is attached to the rear window frame 5. Corresponding fastening points are indicated here by 29. It is clear that one such slotted link body 28 is provided on each side of the vehicle. The respective rear coupling link 15 is preferably mounted on the rear window frame 5 not directly but rather via the slotted link body 28. Accordingly, the associated bearing point 19 is formed here on the slotted link body 28.

As here, the slotted link body 28 can have further guides 30 which interact, for example, with a further coupling linkage 31 with the aid of which the roof section 2, for example the second surface bow 6, which adjoins the rear window frame 5 to the front when the top 1 is closed can be lowered relative to the rear window frame 5 and can be moved under the rear window frame 5, in order to bring about the open position.

By means of a pivoting displacement of the control link 10, firstly the clamping hoop 7 and, secondly, the rear window frame 5, via the driving link 20, are driven into displacement movement. A dedicated drive for the clamping hoop 7 is unnecessary in the case of the top 1 according to the invention. The control link 10, for its part, can be driven via a main control link (not shown here) which is coupled to a suitable actuator.

FIGS. 2 and 3 show enlarged views of one of the rear coupling links 15, to be precise from the inside to the outside, while, in FIG. 1, the view of the rear region of the top 1 takes place from the outside to the inside. In the embodiments of FIGS. 2 and 3, the two stops 23, 24 are formed integrally on the clamping hoop 7, with only part of the clamping hoop 7 being illustrated. It can be seen that the respective rear coupling link 15 is bent twice between its bearing points 18, 19, thus resulting in a lateral offset in the direction of the pivot axes for the bearing points 18, 19.

In FIG. 2, the rear coupling link 15 bears against the front stop 23, and therefore the closed position of the top 1 is reproduced here. In the open position of the top 1 that is reproduced in FIG. 3, the rear coupling link 15 bears against the rear stop 24. In order to reduce relative movements between the rear coupling link 15 and the respective stop 23, 24 and/or in order to realize or reinforce the prestressing in the bearing of the rear coupling link 15 against the respective stop 23, 24 when the top 1 is in one of its end positions, it can be provided to provide at least one of the stops 23, 24 on the side facing the rear coupling link 15 with a damping coating or damper element 32, indicated by a chain-dotted line, which elastically deforms when the rear coupling link 15 is pressed against it, as a result of which it acts as a spring and produces corresponding restoring forces which reinforce the prestressing between rear coupling link 15 and the respective stop 23, 24. Furthermore, the respective damping coating 25 can damp vibrations between the rear coupling link 15 and the respective stop 23, 24.

The invention claimed is:

1. A top for a convertible vehicle, comprising:
   a plurality of roof sections movably disposed between a closed position, in which said roof sections are disposed one behind another in a direction of travel, and an open position, in which the roof sections are disposed one above another;
   said roof sections including a rearmost roof section in a forward direction of travel, when the top is closed, configured as a rear window frame for receiving a rear window, and a second roof section disposed in front of said rear window frame when the top is closed;
   a linkage for displacing said roof sections between the open and closed positions;
   said linkage having a control link, on each side of the vehicle, for controlling kinematics of said second roof section and mounted pivotally on a bracket stationarily fastened or to be fastened to the vehicle;
   said linkage having a clamping hoop extending from one side of the vehicle to an opposite side of the vehicle;
   said linkage having a coupling linkage for controlling kinematics of said rear window frame, said coupling linkage including, on each side of the vehicle, a forward coupling link and a rear coupling link;
   each said forward and rear coupling links being pivotally mounted to said clamping hoop and to said rear window frame;
   a front stop and a rear stop formed on said clamping hoop on at least one side of the vehicle, said rear coupling link bearing against said front stop when the top is closed and bearing against said rear stop when the top is open.

2. The top according to claim 1, wherein said linkage is configured such that the respective said rear coupling link bears under prestress against the rear stop in the open position, and/or the respective said rear coupling link bears under prestress against the front stop in the closed position.

3. The top according to claim 1, wherein said clamping hoop has ends on both sides of the vehicle each pivotally mounted on a respective said control link.

4. The top according to claim 1, wherein said coupling linkage on each side of the vehicle has a driving link articulated to the respective said control link and to the respective said front coupling link.

5. The top according to claim 1, wherein said front stop and said rear stop are formed integrally on a stop body attached to said clamping hoop.

6. The top according to claim 1, wherein said front stop and said rear stop are integrally formed on the clamping hoop.

7. The top according to claim 1, which comprises a guide formed on said rear window frame and wherein a bearing point, at which the respective said front coupling link is pivotally mounted to said rear window frame, is displaceably mounted in said guide formed on said rear window frame.

8. The top according to claim 7, wherein said guide is formed in a slotted link body attached to said rear window frame.

9. The top according to claim 8, wherein the respective said rear coupling lever is pivotally mounted on the respective said slotted link body.

10. The top according to claim 1, which comprises a flexible covering at least partially covering said linkage or said linkage and said roof sections.

11. The top according to claim 1, wherein said roof sections are sheet-type components shaped, in the closed position of the top, to form a closed roof contour extending from the front to the rear in the direction of travel.

12. A convertible, comprising a top according to claim 1 mounted to a roof of the convertible.

* * * * *